United States Patent [19]

Blachon

[11] Patent Number: 4,827,114
[45] Date of Patent: May 2, 1989

[54] PROCESS AND DEVICE DESIGNED TO SCRAMBLE THE DATA OF A BAR CODE BY MEANS OF A TRANSPARENT WRAPPING

[76] Inventor: Georges Blachon, Rue Traversiere, F 43220 Dunieres, France

[21] Appl. No.: 71,272
[22] PCT Filed: Oct. 14, 1986
[86] PCT No.: PCT/FR86/00352
§ 371 Date: Jul. 15, 1987
§ 102(e) Date: Jul. 15, 1987
[87] PCT Pub. No.: WO87/02330
PCT Pub. Date: Apr. 23, 1987

[30] Foreign Application Priority Data

Oct. 17, 1985 [EP] European Pat. Off. ........ 85420182.9
Jul. 17, 1986 [EP] European Pat. Off. ........ 86420193.4

[51] Int. Cl.[4] .............................................. G06K 19/00
[52] U.S. Cl. .................................... 235/487; 235/494; 283/77
[58] Field of Search .................. 235/487, 494; 283/77

[56] References Cited

FOREIGN PATENT DOCUMENTS 2172850 3/1985 United Kingdom ................ 283/77

Primary Examiner—Harold I. Pitts
Attorney, Agent, or Firm—Remy J. VanOphem

[57] ABSTRACT

A soft, transparent film designed to wrap unitary products having a network of irregular scrambling lines printed on the film. The unit tags whose data are bar coded become illegible through the wrap while the collective tag whose data pertains to the collection of boxes included in the lot remains visible.

6 Claims, 7 Drawing Sheets

PROCESS AND DEVICE DESIGNED TO SCRAMBLE THE DATA OF A BAR CODE BY MEANS OF A TRANSPARENT WRAPPING

BACKGROUND OF THE INVENTION

Field of the Invention

The present invention pertains to a process and a device designed to scramble, through a transparent wrapping, various data, particularly when the data are symbolized by a bar code.

The use of bar codes which are automatically read by a magnetic reading head is becoming more and more popular. It is, thus, possible to automatically read the number of a check, the address on a piece of mail or the price of an object. In department stores in particular, it is customary to affix on the items offered for sale a bar coded tag having various indications, including the price. As the customer gives the item to the cashier, the latter slides the reading head in front of the tag whose data is automatically stored in a computer designed to handle accounting as well as inventory control operations in general.

A problem arises, however, in the case where several unitary items are grouped in a single lot that the customer purchases as a whole. Indeed, if several unitary products, each bearing its individual tag, are grouped under a single wrap, often a soft, transparent plastic bag, the price of the lot is marked on a collective tag affixed to the wrapping bag. Therefore, as the customer brings his purchase to the cashier, there is a chance that the price will be misread. Indeed, if the cashier inadvertently sweeps the reading head over one of the individual tags of the unit products instead of the coded tag bearing the price of the lot, the customer will only be requested to pay the unit price, causing a loss to the store.

SUMMARY OF THE INVENTION

The process which is the subject of the invention is designed to prevent reading of bar coded data through a soft, translucent or transparent wrapping film. This process is characterized by the fact that the film includes at least one obstacle able to destroy the discriminating ability of a traditional reading head whose reading beam is pointed through the film to try to read the above mentioned coded data through that film.

According to the another feature of the invention, the obstacle is composed of characters that are printed on the film in such a fashion as to constitute an impervious obstacle which interrupts, at least partially, the passage of the reading beam.

According to another feature of the invention, the obstacle is composed of characters that are printed on the film and designed to cause confusion with the coded data whose contrast is thus reduced below the discriminating threshold of the reading head.

According to another feature of the invention, the obstacle is composed of a compound which is incorporated in the film and stops light beams whose wave length is less than 0.65 micron, such as metal oxides including zinc oxide, iron oxide, titanium oxide or other master compounds, for example.

According to another feature of the invention, the master compound is deposited in a continuous layer on at least one face of the film and on all or part of its surface.

According to another feature of the invention, the master compound is incorporated in the film matter at the production stage.

According to another feature of the invention, a network of irregular lines is traced on at least part of the soft film surface.

According to another feature of the invention, the lines are traced through a printing process.

According to another feature of the invention, the scrambling lines are traced following a dense network, the distance between two consecutive lines being about the same as the average distance between two consecutive bars of the bar code used.

According to another feature of the invention, the lines are identical to one another and printed next to each other following a zig-zag pattern.

According to another feature of the invention, the color of the printed pattern is such that it is difficult for the reading head to differentiate the color of the coded bars whose reading is to be scrambled.

The attached drawings will give a better understanding of the features of the invention.

DETAILED DESCRIPTION OF THE PREFERRED EMBODIMENT

Figure 1:
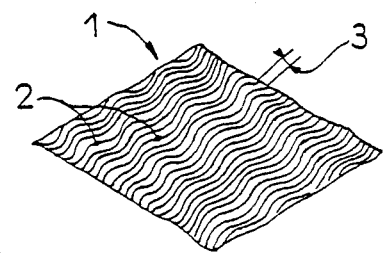
FIGS. 1, 2 and 3 illustrate several possible patterns for the scrambling lines as described in the present invention.
Figure 2:
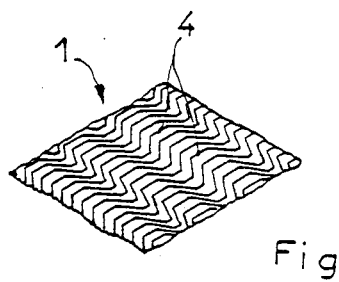
Figure 3:
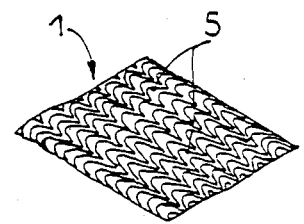
Figure 7:
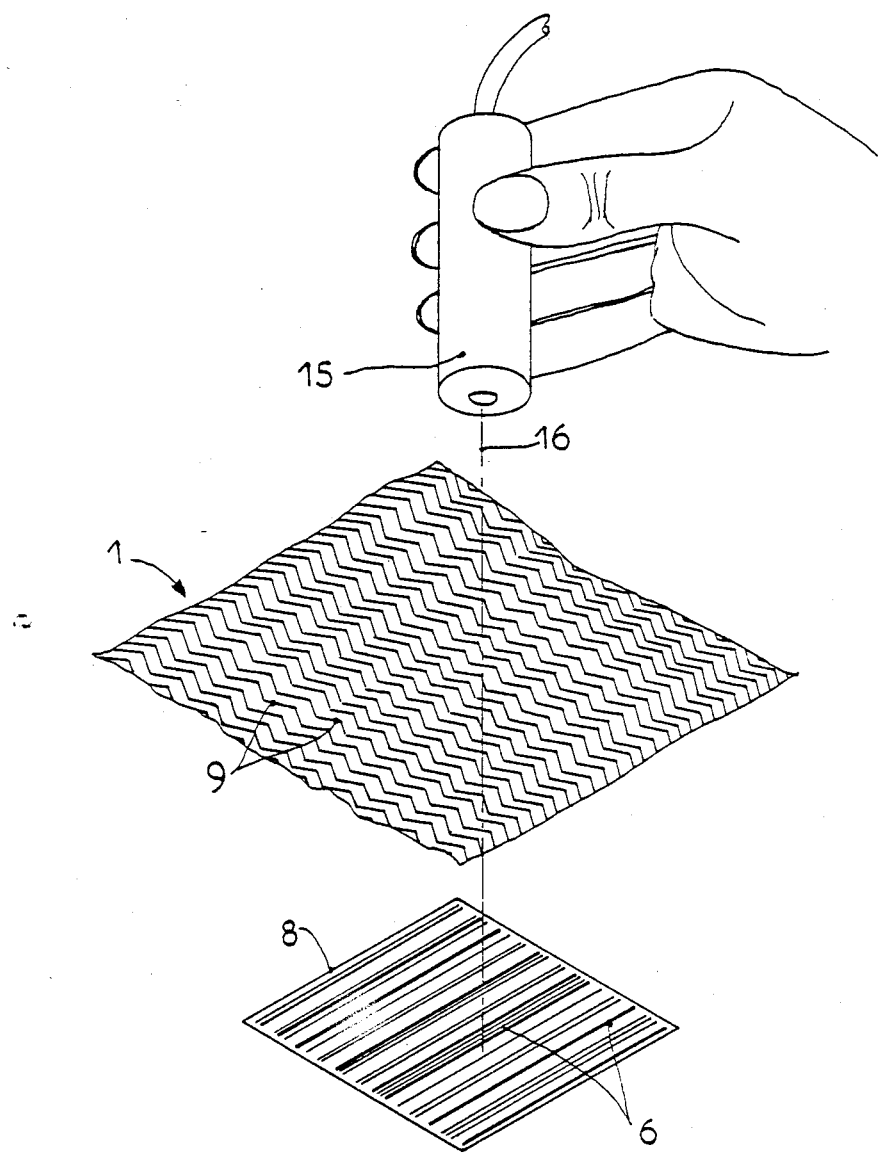
FIG. 7 illustrates the operating mode of the scrambling process of the invention to read, for instance, the coded price tag in a department store.

The drawings illustrate a soft and transparent wrapping film 1 made of a plastic material, for example. The film 1 is imprinted with a network of lines 2 which, in the case of FIG. 1, are approximately sinusoidal. The lines 2 may, for example, be printed in black. The lines are separated one from another by a space 3 which measures approximately one to two millimeters. In the case of FIG. 2, the scrambling lines 4 are printed following a Greek key pattern. On the film 1 of FIG. 3, each scrambling line 5 is traced following a pattern of consecutive arcades. Other patterns could, of course, be used. However, a common feature is that they are not simply straight so that they do not perfectly coincide with code bars 6, illustrated in FIG. 7, traced on tags 8 to indicate the price of the merchandise for instance. Each line 9 printed on the soft film 1 as shown in FIG. 7 follows a zig-zag or dotted pattern.

Figure 4:
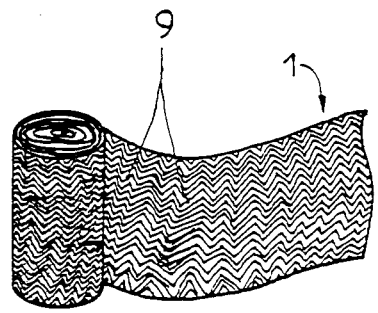
FIG. 4 illustrates a possible variation wherein the scrambling lines are printed all over the surface of the wrapping sheet.

The scrambling lines, such as lines 2, 4, 5, or 9, may be traced throughout the film 1, as shown on FIG. 4, or on a portion thereof.

The operation is as follows.

Figure 6:
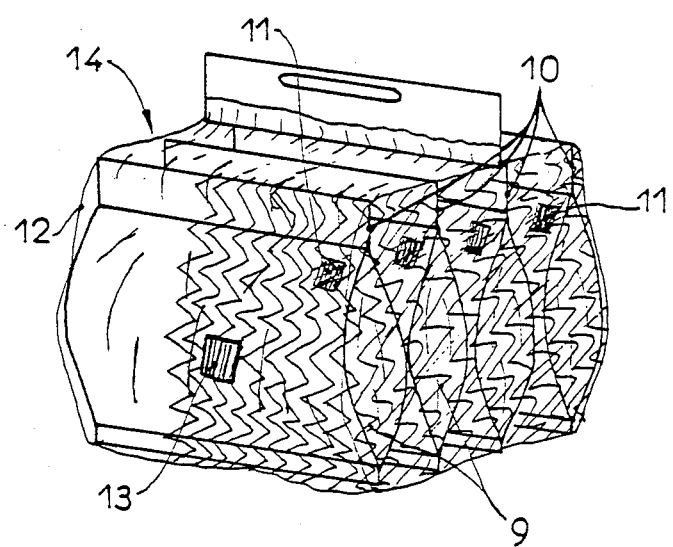
FIG. 6 illustrates another variation wherein several unit bags are grouped in a single bag including the features of the invention.

With reference to FIG. 6, a lot of four items or bags 10 are illustrated, each one bearing its own individual tag 11 where the unit price is coded by means of the traditional bar code. According to the invention, the four bags 10 are placed in an envelope 12 made of the film 1 described in the invention. The film 1, therefore, includes scrambling lines, such as lines 9. On one face of the envelope 12, a new global tag 13 is affixed to indicate, by means of a bar code, the price of the whole lot 14.

Usually, as the customer comes to the cash register, the cashier sweeps a reading head 15 over each coded tag 8. The beam 16 of the reading head 15 thus reads the data included in the code bar 6 and sends them to the store's computer. These data are then processed, first for inventory control and then to display the price charged to the customer.

In the case of the lot 14, it is clear that the cashier must sweep the beam 16 of the reading head 15 several times over the tag 13 which indicates the total price and not over one or the other tags indicating the unit price of each individual item or bag 10. This operation would present a risk if the film constituting the envelope 12 was entirely transparent. The presence of the scrambling lines eliminates such a risk, since the global tag 13 alone remains intelligible to the reading head 15. If the cashier happened to pass the reading head 15 over either tag 11, the presence of the scrambling lines 9 would immediately point out the error without recording any of the erroneous data.

Figure 5:
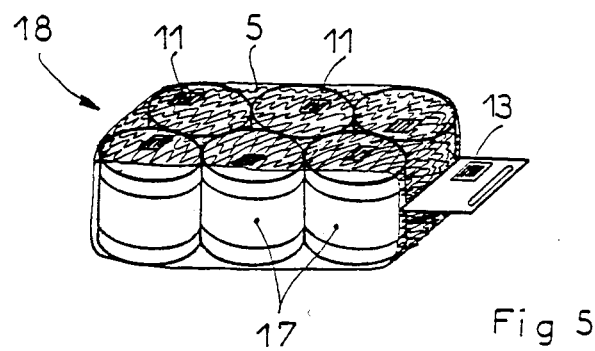
FIG. 5 illustrates a variation consisting of six items wrapped in a single package to be sold as a unit.

In the example illustrated in FIG. 5, the film 1, scrambled according to the invention, is simply used to encircle six cans 17 in a lot 18, without wrapping the entire package on each surface. It is sufficient that the encircling transparent wrapping film 1 covers each individual tag 11 of each can 17 so as to leave a single collective tag 13 visible for the reading head 15.

The invention would, of course, still apply if the scrambling lines 2, 4, 5, and 9 were to be traced following any other pattern. They all could conceivably be straight, provided that they are not parallel with the code bars 6.

Figure 8:
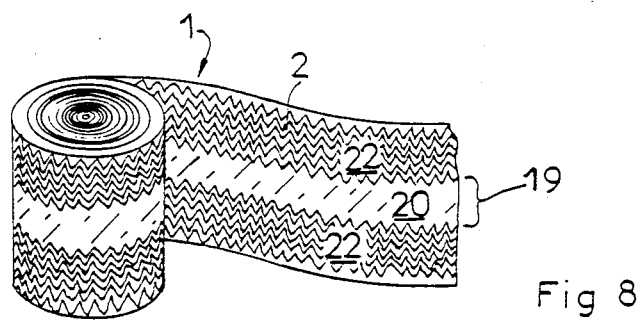
FIG. 8 illustrates another variation of a transparent film, scrambled as described according to the present invention.
Figure 9:
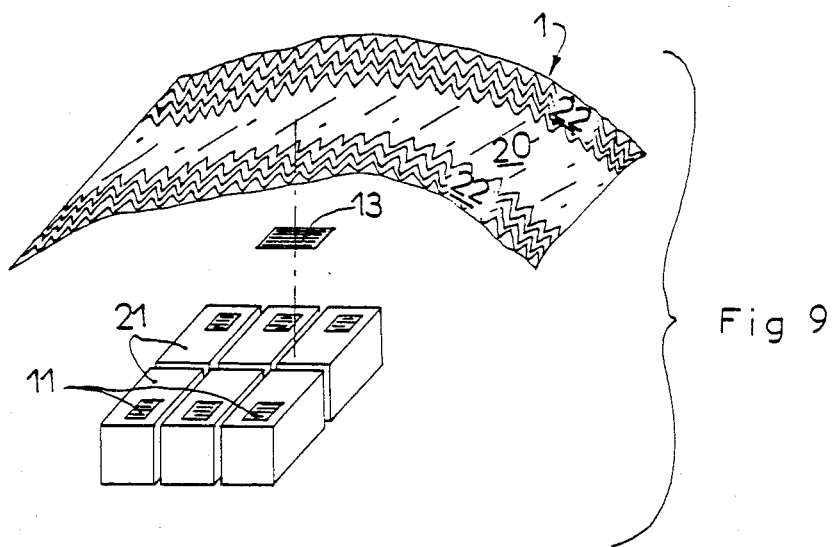
FIG. 9 shows how to utilize the transparent film of FIG. 8 to group several items in a single lot.

In the embodiment shown in FIG. 8, the transparent wrapping film 1 is scrambled, as previously described, by a network of printed lines 2 that are irregular but only cover part of the wrapping film's surface. A strip 20 is provided which is transparent and devoid of scrambling lines 2 for a width 19.

In order to offer several individual items 21, each having a tag 11, for sale in a single lot, the items should be placed next to one another and covered with a sheet cut from the wrapping film 1, making sure that the individual tags 11 are completely covered with the scrambling lines 2 provided on scrambling strips 22 located on the wrapping film 1 on either side of the clear strip 20. The collective tag 13 which is applicable to the entire lot 23 of individual items 21 is affixed or printed on the internal face of the clear strip 20 of the film prior to wrapping the film 1 around the items. The tag 13, thus, remains entirely legible on the wrapped lot 23.

Figure 10:
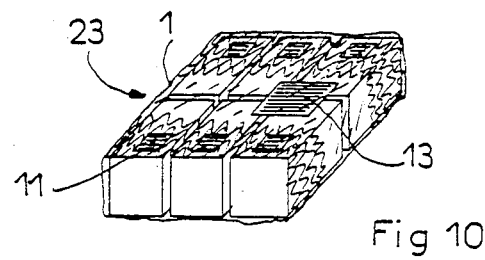
FIG. 10 illustrates the lot thus obtained ready for sale.

FIG. 10 illustrates the dual advantages offered by this embodiment.

The individual tags 11 are screened by the scrambling lines 2, which eliminates any chance of error by the cashier.

Furthermore, the tag 13 located inside, under the film 1 which protects it, cannot be tampered with, eliminating any possibility of fraud.

Figure 11:
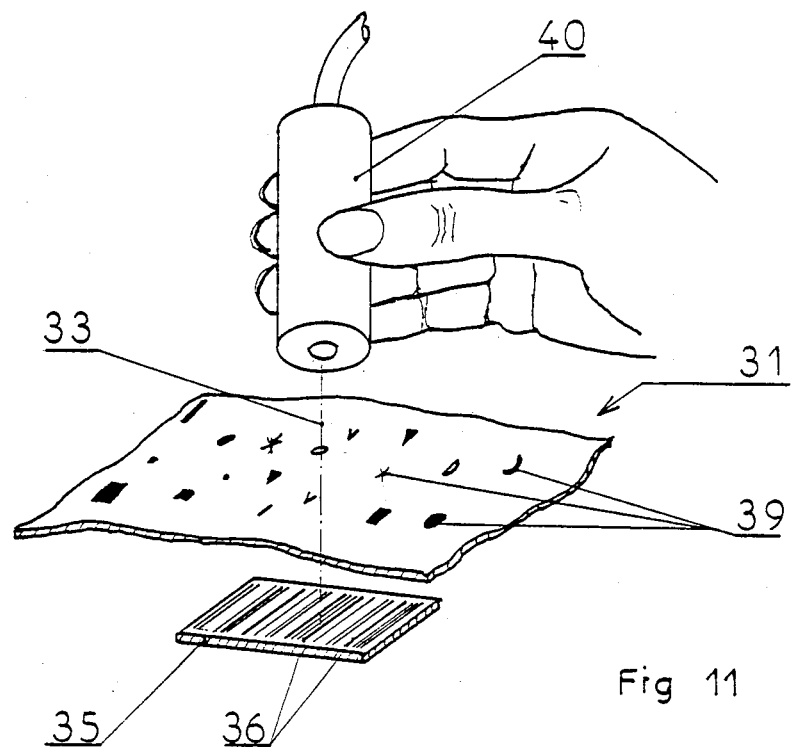
FIG. 11 illustrates a wrapping film imprinted with a network of dots of variable shapes, spacing and dimensions, as described in the invention.
Figure 12:
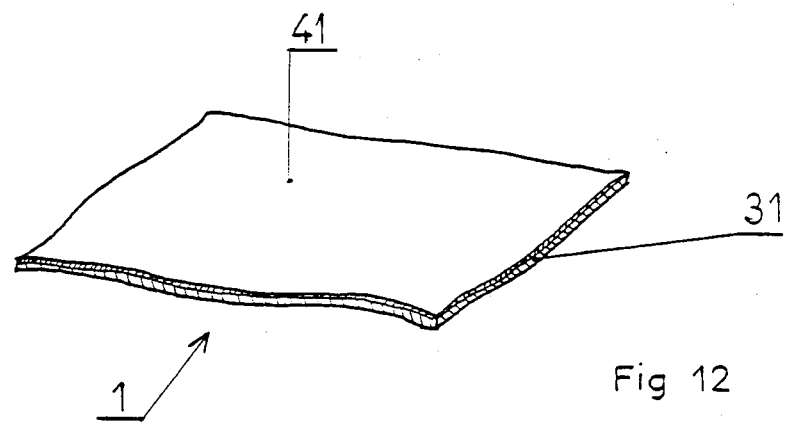
FIG. 12 illustrates a film covered with a continuous screen like coating.
Figure 13:
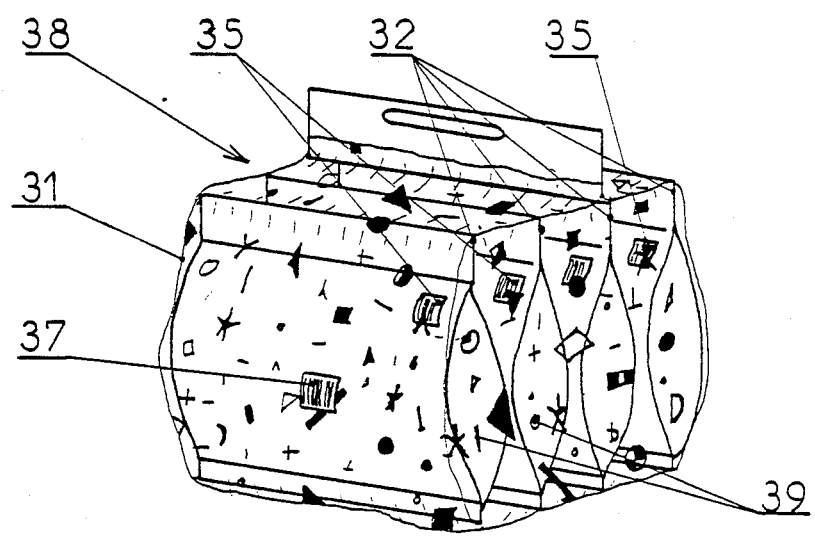
FIG. 13 illustrates a lot composed of four items wrapped in a bag made of a film as described in the invention.

FIGS. 11 through 13 illustrate a soft, clear or translucent film or sheath 31 designed to group individual items 32 around which a wrapping 38 is provided.

The wrapping film 31 is either printed, as shown in FIG. 11, or equipped, through incorporation, depositing, coating, coextrusion etc., with a coloring product acting as a shield against the reading beam 33 of a traditional device 40 used to read a tag 35 bearing bar coded data 36. The tag 35 may be affixed or printed.

Each individual coded tag 35 becomes illegible through the wrapping 38; the collective symbol of the lot, such as the external tag 37, thus remains solely visible.

The film features the following.

On at least part of the surface of the film 31, a screen is printed which may consist of variably sized dots 39 which are irregularly spaced from one another, and which can, conceivably, have different shapes.

It is possible to print other patterns for the purpose of at least partially masking the symbols of the bar coded data 36 in order to prevent the reading thereof, while leaving the symbols visible to the eye, provided that the screening beam 33 of the reading device meets at least one obstacle placed over or between the bars of the bar coded data 36 to obliterate and, thus, make reading of the symbols impossible.

The continuous print or referenced patterns are affixed to soft sheathes or films 1, such as polyolefins.

The printing may be done on the internal or external face, or even between various layers of sheathing or films.

It is possible to obtain a similar result by incorporating in the material of the film 31, a coloring product which stops the beams whose wave length is less than 0.65 micron, such as metal oxides like zinc oxide, iron oxide or titanium oxide.

The obliterating product may be deposited in a continuous layer 41 on all or part of the surface of film.

Furthermore, the film 31 may be covered with a collective code wherein the tag 37 would be replaced by a directly printed labelling.

Having thus described the present invention by way of an exemplary embodiment, it will be apparent to those skilled in the art that many modifications may be made from the exemplary embodiment without departing from the spirit of the present invention or the scope of the claims appended hereto.

What is claimed is:

1. A process of packaging a group of separate items each individually tagged with a machine readable coded label, comprising the steps of:
   substantially completely enclosing all of said group of items together with a substantially transparent wrapper;
   emplacing a machine readable coded label on the outside of said wrapper; and
   obscuring at least a portion of said wrapper whereat said individual item labels are located to defeat machine reading of said coded label on each of said group of items through said wrapper while enabling viewing of said items through said wrapper and allowing machine reading of said machine readable coded label on said outside of said wrapper.

2. The process according to claim 1 wherein said obscuring step comprises the step of imprinting a pattern over said wrapper which defeats machine reading of said label on each said individual item.

3. The process according to claim 2 wherein in said imprinting step a series of closely spaced non-straight lines are imprinted on said wrapper.

4. The process according to claim 2 wherein in said imprinting step said pattern is imprinted substantially entirely over said wrapper.

5. The process according to claim 1 wherein said obscuring step comprises the step of treating said wrapper to block the passage of light below a predetermined wave length.

6. The process according to claim 5 wherein in said treating step, light below approximately 0.65 micron is blocked by said treatment.

* * * * *